United States Patent [19]

Greenawalt

[11] Patent Number: 4,529,231
[45] Date of Patent: Jul. 16, 1985

[54] FLAT-FACE TUBE CONNECTOR

[75] Inventor: Thomas A. Greenawalt, Van Wert, Ohio

[73] Assignee: Aeroquip Corporation, Jackson, Mich.

[21] Appl. No.: 676,215

[22] Filed: Nov. 28, 1984

Related U.S. Application Data

[63] Continuation of Ser. No. 518,543, Jul. 29, 1983, abandoned.

[51] Int. Cl.³ .............................................. F16L 19/08
[52] U.S. Cl. .................................. 285/342; 285/382.7
[58] Field of Search ...................... 285/382.7, 341, 342, 285/343

[56] References Cited

U.S. PATENT DOCUMENTS

| | | | |
|---|---|---|---|
| 2,377,891 | 6/1945 | Laue | 285/342 |
| 2,511,134 | 6/1950 | Stranberg | 285/382.7 X |
| 2,693,374 | 11/1954 | Wurzburger | 285/382.7 X |
| 2,912,262 | 11/1959 | Franck | 285/382.7 X |
| 3,468,566 | 9/1969 | Nietzel | 285/382.7 X |
| 3,857,591 | 12/1974 | Voss | 285/382.7 X |
| 4,136,896 | 1/1979 | Rodman et al. | 285/341 |
| 4,136,897 | 1/1979 | Haluch | 285/382.7 X |

FOREIGN PATENT DOCUMENTS

| | | | |
|---|---|---|---|
| 2323085 | 11/1974 | Fed. Rep. of Germany | 285/382.7 |
| 1069523 | 7/1954 | France | 285/343 |
| 2395451 | 2/1979 | France | 285/342 |

OTHER PUBLICATIONS

Aeroquip Industrial Engineering Bulletin IEB 277-1982.

Primary Examiner—Thomas F. Callaghan
Attorney, Agent, or Firm—Beaman & Beaman

[57] ABSTRACT

The invention pertains to a fitting for tubes wherein a flat face fitting having a sealing face perpendicular to the fitting axis may be sealed to a metallic tube without modification to the tube. An annular ferrule mounted upon the tube includes a head having a flat radial surface for engaging the fitting seal face, and the ferrule includes an annular deformable sleeve portion having internal serrations deformed into a metal-to-metal sealing relationship with the tube by a compression nut threaded upon the fitting body. The ferrule and nut include abutment surfaces which engage to limit nut tightening preventing over-stressing of the ferrule and fitting components.

2 Claims, 2 Drawing Figures

FLAT-FACE TUBE CONNECTOR

This is a continuation of application Ser. No. 518,543, filed July 29, 1983 and now abandoned.

BACKGROUND OF THE INVENTION

One of the variety of conduit fittings conventionally employed in conduit systems includes a "flat-face" seal tube connector. In this connector the fitting body is provided with a flat radial surface end lying in a plane perpendicular to the fitting body axis, and an annular recess is usually defined within the fitting body end intersecting the end surface receiving an elastomeric ring normally slightly axially projecting beyond the plane of the surface. A component to be connected to the "flat-face" connector includes a radial flange which engages the fitting body seal face and elastomeric ring, and connector means, such as a nut, are employed to force the flange against the seal face to establish a fluid tight connection.

Such a fitting connection requires that the tube be accurately flanged so as to be capable of establishing a sealed relationship to the radial fitting surface, and such machining or shaping is expensive and time-consuming.

It is an object of the invention to provide fitting structure permitting a tube to be attached to a flat-face fitting body in a fluid tight relationship without modification to the tube.

A further object of the invention is to provide a tube connector fitting of a flat-face type wherein machining or modification to the tube is not required, and wherein a metal-to-metal sealing engagement exists between the components to assure fluid tight assembly.

Another object of the invention is to provide a flat-face sealed tube connector which eliminates the need for tube modification by employing a ferrule, and the ferrule includes means for achieving a positive "stop" with respect to the assembly nut axial movement to prevent undesirable deforming of the ferrule or tube.

An additional object of the invention is to provide a flat-face sealed tube connector utilizing a ferrule wherein the ferrule includes serrations embedding into an unmodified tube, and an elastomer ring may be employed with the ferrule for further preventing leakage.

In the practice of the invention, a fitting body includes a radial face having an annular recess defined thereon receiving an elastomeric "O" ring having a greater normal axial dimension that the depth of the recess. The fitting body is externally threaded adjacent its end, and the fitting body may be soldered or threaded upon a tube or other conduit system connection, or otherwise permanently affixed to the conduit system.

A ferrule placed upon the end of a metal tube includes a concentric recess for receiving the end of the tube, and a flat radial surface for engaging the fitting body sealing face and "O" ring. A compression nut rotatably mounted upon the tube includes threads for engaging the threads of the fitting body, and also includes an annular conical cam surface for engaging and inwardly deforming an annular sleeve portion formed upon the ferrule. Internally, the ferrule includes serrations which embed into the tube as the nut is tightened, and an elastomeric ring may be located within the ferrule adjacent to the serrations for compression upon the tube as the nut is tightened.

The ferrule head includes a radial abutment surface axially spaced from the ferrule sealing face, and a radial surface defined upon the compression nut engages the ferrule abutment surface upon the nut being threaded to its full extent upon the fitting body. The engagement of the abutment surfaces produces a positive stop which ensures a consistent assembly procedure and prevents extrusion or undesirable deformation of the ferrule or other components. The positive stop engagement of the ferrule and nut immediately informs the operator that the assembly of the fitting is complete.

As the tube end is merely inserted into the ferrule recess, no prior machining or deforming of the tube is required, the tube only needs to be cut to the desired length, and the only modification to the tube end that occurs is the embedding of the ferrule serrations therein during tightening of the nut.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
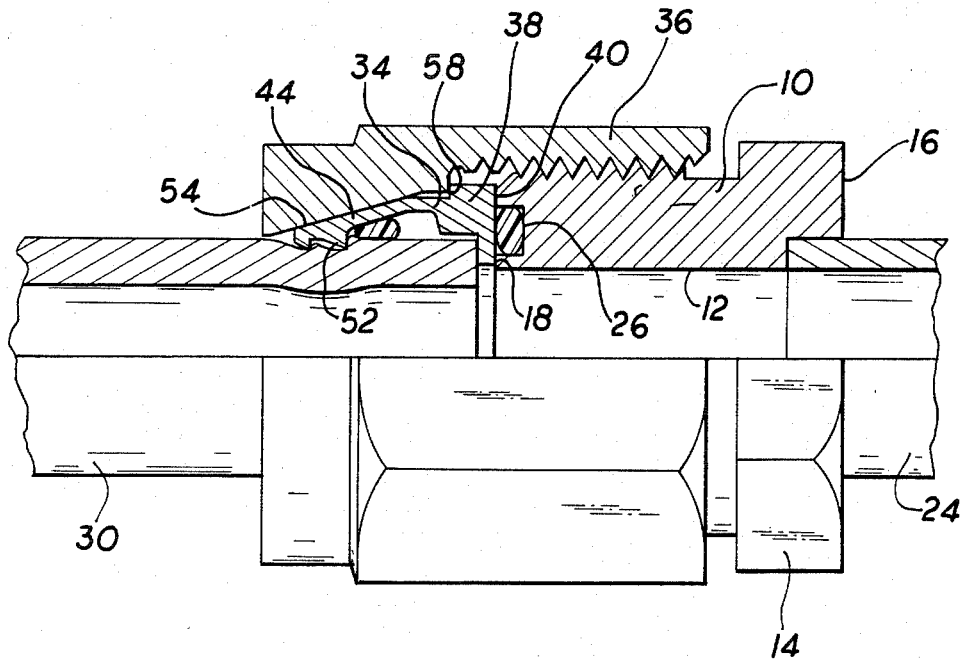
FIG. 1 is an elevational view, partially sectioned, illustrating a flat-face seal tube connector in accord with the invention in its fully assembled condition.

The fitting components of the invention will be appreciated from the drawing figures. The basic component is the annular fitting body 10 which is axially bored at 12, and includes wrench engaging flats 14, and end 16, and outer end 18, and is externally threaded at 20 adjacent the outer end. A recess 22 is concentrically defined in the fitting body intersecting end 16 for receiving a conduit 24, such as copper tube, or the like, which is soldered into the recess 22 establishing a fluid tight connection.

The outer end 18 is planar in configuration and is perpendicularly related to the axis of the fitting body. An annular recess 26 is defined within the end 18 and receives an elastomeric "O" ring 28 of a normal diameter greater than the axial depth of the recess 26 wherein upon assembly of the "O" ring into the recess a portion of the ring will axially extend beyond the plane of the fitting body end 18.

A tube 30 is to be connected to the fitting body 10, and the tube is of a cylindrical configuration including a squared region end 32. A ferrule 34 is mounted upon the end 32, FIG. 2, as is the compression nut 36.

The ferrule 34 is of an annular form, usually constructed of a material having a hardness greater than that of the tube 30. The ferrule includes an annular head 38 having a flat radial surface 40 of a radial dimension substantially corresponding to that of the outer fitting body end 18 and is in axial opposed relationship thereto when assembled upon the tube 30 and during operation. The head 38 also includes an annular recess 42 adapted to closely receive the end of the tube 30 and a conical sleeve portion 44 of thinned wall section which extends to the left toward the tube 30, FIG. 2.

In asssembly, the nut 36 is first inserted over the end of the tube 30, and the minimum diameter of the nut as represented at 46, is slightly greater than the tube diameter permitting such assembly. Thereupon, the ferrule 34 may be slipped upon the end of the tube 30, and is axially pushed upon the tube until the tube end 32 is received within the ferrule head recess 42. Thereupon, the tube is axially aligned with the fitting body 10, and the nut threads 48 are preliminarily threaded upon the fitting body threads 20, as represented in FIG. 2.

Preferably, although it is not required, an annular elastomeric "O" ring 50 is located within the ferrule under the sleeve portion 44 and intermediate the serrations 52 and head 38, as will be appreciated from the drawings. The ring 50 is of such diameter that the outer diameter of the tube and inner surface of the sleeve portion will be engaged thereby.

Figure 2:
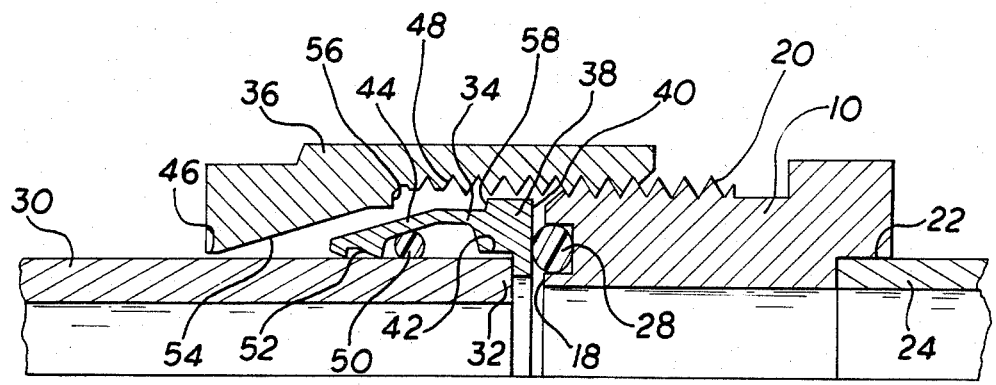
FIG. 2 is a detail, diametrical sectional view of the connector of the invention illustrating the relationship of the components after initial assembly, but prior to tightening of the compression nut.

Upon the preliminary assembly taking place as shown in FIG. 2, the nut 36 is then rotated in a clockwise direction to translate the nut toward the right, FIG. 1, engaging the nut cam surface 54 with the ferrule sleeve 44. Such engagement of the nut and sleeve, due to their conical configuration, causes the sleeve portion 44 to deform radially inwardly embedding the serrations 52 into the tube as apparent in FIG. 1 thereby establishing a metal-to-metal sealed relationship between the nut, ferrule and tube. Of course, the embedding of the serrations into the tube also prevents withdrawal of the tube from the compression nut, or ferrule, and a tight mechanical connection of the tube to the ferrule is achieved.

The compression nut 36 will continue to be rotated until the radial annular abutment 56 engages the ferrule radial abutment surface 58. Continued rotation of the nut will establish a firm engagement between the fitting body end 18 and the ferrule surface 40, compressing the "O" ring 28 thereby establishing a fluid tight relationship between the ferrule and the fitting body.

As the abutment surfaces 56 and 58 are radially disposed engagement of the sealing surfaces 18 and 40 will immediately produce a positive "stop" with respect to continued nut rotation indicating to the operator that the assembly has been completed and over tightening of the nut is prevented wherein such action could extrude or otherwise damage the ferrule and its relationship with the tube or fitting body.

It will, therefore, be appreciated that the use of the ferrule 34 and nut 36 permits a tube to be mounted to a "flat-face" fitting body without modification to the tube and the invention permits standard flat-face seal fittings to be readily utilized with a wide variety of tubes without requiring tube forming or deformation. The serrations of the ferrule may be heat treated to increase their hardness well above that of the tube to improve embedding and the metal-to-metal seal desired. The positive engagement between the abutment surfaces provides a positive "stop" relative to the compression nut movement and the use of the abutment surfaces assures consistent assembly procedures and prevents over stressing of the ferrule tube or nut. Further, the reception of the inner end of the tube into the ferrule recess 42 supports the tube against vibration. The use of the "O" ring 50 is particularly desirable in high vibration applications, or when the fitting is used in refrigeration service.

It is appreciated that various modifications to the inventive concepts may be apparent to those skilled in the art without departing from the spirit and scope of the invention.

I claim:

1. A connector for attaching a tube to a tubular fitting having an axis, an externally threaded portion and a flat sealing face substantially perpendicular to the fitting axis comprising, in combination, an annular ferrule having an axis adapted to be placed upon the end region of a tube, said ferrule including an annular head having a concentric recess for receiving the end of a tube, a flat seal face defined upon said ferrule head within a plane substantially perpendicular to the ferrule axis and adapted to be located in an opposed axially aligned relationship to the fitting flat sealing face, a deformable sealing sleeve portion defined upon said ferrule concentric to the axis thereof and extending from said head adapted to be deformed inwardly upon the associated tube and having an end axially spaced from said head, a conical external surface defined upon said ferrule sleeve portion, radially projecting annular serrations defined internally upon said ferrule sleeve portion adjacent said sleeve portion end and adapted to engage and embed into the tube, an annular recess defined internally upon said ferrule sleeve portion intermediate said serrations and head, a nut surrounding said ferrule having threads adapted to engage the fitting threaded portion, an internal conical cam surface defined upon said nut adapted to engage said ferrule sleeve portion conical surface and deform said ferrule sleeve portion inwardly into a sealing engagement with the tube, first abutment means defined upon said ferrule head axially spaced from said head seal surface comprising a surface substantially perpendicular to said ferrule axis, second abutment means defined upon said nut comprising a surface substantially perpendicular to said ferrule axis in axial alignment with said first abutment means engaging said first abutment means upon completion of the assembly of the nut upon the fitting, and an annular recess defined within and intersecting the fitting sealing face, and an elastomeric sealing ring within said recess having a normal axial dimension slightly greater than said annular recess.

2. In a connector as in claim 1, said first abutment means comprising a radial shoulder defined upon said ferrule head facing said ferrule sleeve portion and said second abutment means comprising a radial shoulder defined on said nut facing toward said nut threads.

* * * * *